(12) United States Patent
Kuo et al.

(10) Patent No.: US 12,333,107 B2
(45) Date of Patent: Jun. 17, 2025

(54) DISPLAY PANEL AND DISPLAY APPARATUS

(71) Applicant: Huawei Technologies Co., Ltd., Shenzhen (CN)

(72) Inventors: Tawei Kuo, Shenzhen (CN); Junyong Zhang, Dongguan (CN); Haiming He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/629,163

(22) Filed: Apr. 8, 2024

(65) Prior Publication Data

US 2024/0256078 A1 Aug. 1, 2024

Related U.S. Application Data

(63) Continuation of application No. 17/799,569, filed as application No. PCT/CN2020/136410 on Dec. 15, 2020, now Pat. No. 11,983,358.

(30) Foreign Application Priority Data

Feb. 14, 2020 (CN) .......................... 202010093549.5

(51) Int. Cl.
*G06F 3/041* (2006.01)
*G06F 1/16* (2006.01)
*G06F 3/044* (2006.01)

(52) U.S. Cl.
CPC ........ *G06F 3/04164* (2019.05); *G06F 1/1652* (2013.01); *G06F 3/0412* (2013.01);
(Continued)

(58) Field of Classification Search
CPC ...... G06F 3/041–047; G06F 2203/041–04114; G06F 3/044; G06F 3/0445; G06F 3/0443; G06F 1/1652; G06F 2203/04102; G06F 1/1641; G06F 3/0412; G06F 1/161; G06F 3/0446; G06F 1/1643; G06F 1/1647; G06F 2203/04103;
(Continued)

(56) References Cited

U.S. PATENT DOCUMENTS

2013/0015906 A1 1/2013 Yeh
2013/0278525 A1 10/2013 Lim et al.
(Continued)

FOREIGN PATENT DOCUMENTS

CN 103278955 A 9/2013
CN 103279245 A 9/2013
(Continued)

*Primary Examiner* — Sanjiv D. Patel
(74) *Attorney, Agent, or Firm* — Conley Rose, P.C.

(57) ABSTRACT

A display panel includes a mutual-capacitance touch film layer with a drive electrode system and a sensing electrode system. One of the drive electrode system and the sensing electrode system is a first touch electrode system, and the other is a second touch electrode system. The first touch electrode system includes a plurality of first touch electrodes that extend in a first direction and that are arranged in a second direction, and a plurality of second touch electrodes that extend in the first direction and that are arranged in the second direction.

20 Claims, 10 Drawing Sheets

(52) U.S. Cl.
CPC ...... *G06F 3/041662* (2019.05); *G06F 3/0443* (2019.05); *G06F 3/0446* (2019.05)

(58) Field of Classification Search
CPC .. G06F 3/04886; G06F 1/1618; G06F 3/1446; H10K 59/40
See application file for complete search history.

(56) References Cited

U.S. PATENT DOCUMENTS

| | | |
|---|---|---|
| 2013/0300678 A1 | 11/2013 | Kang et al. |
| 2014/0139447 A1* | 5/2014 | Kang .................... G06F 3/0443 345/173 |
| 2014/0152621 A1 | 6/2014 | Okayama et al. |
| 2014/0168540 A1 | 6/2014 | Wang et al. |
| 2014/0362031 A1 | 12/2014 | Mo et al. |
| 2015/0002249 A1 | 1/2015 | Wilson et al. |
| 2015/0022494 A1 | 1/2015 | Azumi et al. |
| 2015/0324046 A1 | 11/2015 | Lo et al. |
| 2016/0188098 A1 | 6/2016 | Her et al. |
| 2016/0291780 A1* | 10/2016 | Namkung ............. G06F 3/0412 |
| 2017/0068386 A1 | 3/2017 | Lai et al. |
| 2017/0097721 A1 | 4/2017 | Wang |
| 2017/0102821 A1 | 4/2017 | Lai et al. |
| 2017/0139251 A1 | 5/2017 | Wang et al. |
| 2017/0235374 A1 | 8/2017 | Arima |
| 2017/0285837 A1 | 10/2017 | Zeng et al. |
| 2017/0308237 A1 | 10/2017 | Sun et al. |
| 2018/0081219 A1 | 3/2018 | Kim |
| 2019/0235681 A1* | 8/2019 | Li .......................... G06F 3/0445 |
| 2019/0377443 A1 | 12/2019 | Dong et al. |
| 2020/0333918 A1 | 10/2020 | Lin et al. |
| 2021/0365149 A1 | 11/2021 | Liu et al. |

FOREIGN PATENT DOCUMENTS

| | | |
|---|---|---|
| CN | 104731436 A | 6/2015 |
| CN | 105093616 A | 11/2015 |
| CN | 106201109 A | 12/2016 |
| CN | 106775099 A | 5/2017 |
| CN | 107580088 A | 1/2018 |
| CN | 108334215 A | 7/2018 |
| CN | 109508118 A | 3/2019 |
| CN | 109933232 A | 6/2019 |
| CN | 209690889 U | 11/2019 |
| DE | 102016220904 A1 | 10/2017 |
| JP | 2011238146 A | 11/2011 |
| JP | 2014052997 A | 3/2014 |
| JP | 2015043200 A | 3/2015 |
| JP | 2015176200 A | 10/2015 |
| JP | 2017146719 A | 8/2017 |
| JP | 2019185583 A | 10/2019 |
| JP | 2019530047 A | 10/2019 |

* cited by examiner

DISPLAY PANEL AND DISPLAY APPARATUS

CROSS-REFERENCE TO RELATED APPLICATIONS

This application is a continuation of U.S. patent application Ser. No. 17/799,569 filed on Aug. 12, 2022, which is a National Stage of International Patent Application No. PCT/CN2020/136410 filed on Dec. 15, 2020, which claims priority to Chinese Patent Application No. 202010093549.5 filed on Feb. 14, 2020. All of the aforementioned applications are hereby incorporated by reference in their entireties.

TECHNICAL FIELD

This application relates to the field of display technologies, and in particular, to a display panel and a display apparatus.

BACKGROUND

With development of display technologies, increasing display apparatuses can implement a touch display function. As a display area increases, a corresponding touch area also becomes larger. However, for a touch display apparatus with a relatively large size, accuracy of touch recognition is relatively low, and an accidental touch phenomenon tends to occur.

SUMMARY

Technical solutions of this application provide a display panel and a display apparatus, to improve accuracy of touch recognition in a touch display process and reduce a probability of occurrence of an accidental touch phenomenon.

According to a first aspect, the technical solutions of this application provide a display panel, including a display film layer and a mutual-capacitance touch film layer that are stacked. The mutual-capacitance touch film layer includes a drive electrode unit and a sensing electrode unit. One of the drive electrode unit and the sensing electrode unit is a first touch electrode unit, and the other one of the drive electrode unit and the sensing electrode unit is a second touch electrode unit. The first touch electrode unit includes a plurality of first touch electrodes that extend in a first direction and that are arranged in a second direction and a plurality of second touch electrodes that extend in the first direction and that are arranged in the second direction. The plurality of first touch electrodes and the plurality of second touch electrodes are in a one-to-one correspondence, an extension direction of a first touch electrode and an extension direction of a corresponding second touch electrode are located in a same straight line, and the first touch electrode and the corresponding second touch electrode are spaced apart.

Optionally, the display panel is a flexible display panel, and the display panel has a bending axis extending in the second direction. An interval location between each first touch electrode and a corresponding second touch electrode is located on the bending axis.

Optionally, the second touch electrode unit includes a plurality of third touch electrodes that extend in the second direction and that are arranged in the first direction. One part of the plurality of third touch electrodes and each first touch electrode are insulated and crossed, and the other part of the plurality of third touch electrodes and each second touch electrode are insulated and crossed.

Optionally, the first touch electrode unit is the sensing electrode unit, and the second touch electrode unit is the drive electrode unit.

Optionally, the second touch electrode unit includes a plurality of fourth touch electrodes that extend in the second direction and that are arranged in the first direction and a plurality of fifth touch electrodes that extend in the second direction and that are arranged in the first direction. The plurality of fourth touch electrodes and the plurality of fifth touch electrodes are in a one-to-one correspondence, an extension direction of a fourth touch electrode and an extension direction of a corresponding fifth touch electrode are located in a same straight line, and the fourth touch electrode and the corresponding fifth touch electrode are spaced apart. One part of the plurality of fourth touch electrodes and one part of the plurality of first touch electrodes are insulated and crossed, the other part of the plurality of fourth touch electrodes and one part of the plurality of second touch electrodes are insulated and crossed, one part of the plurality of fifth touch electrodes and the other part of the plurality of first touch electrodes are insulated and crossed, and the other part of the plurality of fifth touch electrodes and the other part of the plurality of second touch electrodes are insulated and crossed.

Optionally, the first touch electrode unit further includes a plurality of sixth touch electrodes that extend in the first direction and that are arranged in the second direction. The plurality of sixth touch electrodes and the plurality of second touch electrodes are in a one-to-one correspondence, an extension direction of a second touch electrode and an extension direction of a corresponding sixth touch electrode are located in a same straight line, the second touch electrode is located between a corresponding first touch electrode and the corresponding sixth touch electrode, and the second touch electrode and the corresponding sixth touch electrode are spaced apart.

Optionally, the display panel includes a display region, and an interval location between a first touch electrode and a corresponding second touch electrode is located in the display region.

Optionally, the display panel further includes a first frame region and a second frame region that are located on two opposite sides of the display region. Each first touch electrode extends from the display region to the first frame region, and each first touch electrode is electrically connected to a corresponding first touch signal cable in the first frame region. Each second touch electrode extends from the display region to the second frame region, and each second touch electrode is electrically connected to a corresponding second touch signal cable in the second frame region.

Optionally, each first touch electrode includes a plurality of electrically connected first electrode blocks, each first electrode block includes grid metal wires, each second touch electrode includes a plurality of electrically connected second electrode blocks, and each second electrode block includes grid metal wires.

According to a second aspect, the technical solutions of this application further provide a display apparatus, including the foregoing display panel.

In the display panel and the display apparatus in embodiments of this application, one of the drive electrode unit and the sensing electrode unit includes first touch electrodes and second touch electrodes. An extension direction of a first touch electrode and an extension direction of a corresponding second touch electrode are located in a same straight line, and the first touch electrode and the corresponding second touch electrode are spaced apart. Because it is determined that a first touch electrode and a second touch electrode on coordinates in a same second direction are independent of each other, noise received by one of the first touch electrode and the second touch electrode is not added to the other one of the first touch electrode and the second touch electrode, so that a signal-to-noise ratio of the touch electrode is improved, accuracy of touch recognition is improved, and a probability of occurrence of an accidental touch phenomenon is reduced.

DESCRIPTION OF EMBODIMENTS

Terms used in embodiments of this application are only used to explain specific embodiments of this application, but are not intended to limit this application.

The following clearly describes the conventional technology and the technical solutions of this application with reference to the accompanying drawings. Clearly, the described embodiments are some but not all embodiments of this application. All other embodiments obtained by a person of ordinary skill in the art based on embodiments of this application without creative efforts shall fall within the protection scope of this application.

Terms used in embodiments of this application are merely for the purpose of describing specific embodiments, but are not intended to limit this application.

It should be noted that directional terms such as "top", "bottom", "left", and "right" described in embodiments of this application are described from the angles shown in the accompanying drawings, and should not be construed as a limitation on embodiments of this application. In addition, in the context, it should be further understood that when it is mentioned that one component is connected to another component, the component may be directly connected to the another component, or may be indirectly connected to the another component by using an intermediate component.

Figure 1:
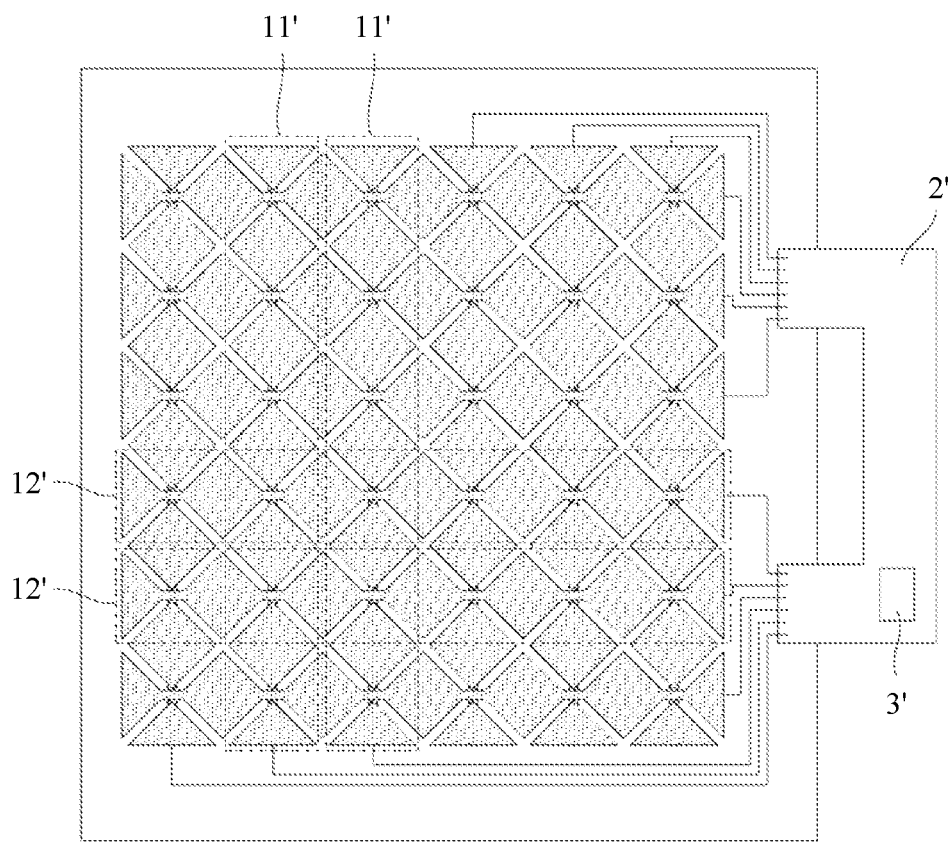
FIG. 1 is a schematic diagram of a structure of a display panel according to the conventional technology.

A display panel in the conventional technology is first described with reference to the accompanying drawings. FIG. 1 is a schematic diagram of a structure of a display panel according to the conventional technology. A mutual-capacitance touch display panel includes insulated and crossed drive electrodes 11' and sensing electrodes 12'. The drive electrode 11' extends from one end of a display region to another end, and the sensing electrode 12' extends from one end of the display region to another end. Each drive electrode 11' or sensing electrode 12' is formed by electrically connecting a plurality of electrode blocks arranged in a direction. As one channel, each drive electrode 11' or sensing electrode 12' is electrically connected to a flexible circuit board 2' by using a signal cable. A chip 3' is disposed on the flexible circuit board 2'. In a working process of touch electrodes, the chip 3' periodically sequentially provides drive signals to the drive electrodes 11', and the chip 3' receives an induction signal generated on the sensing electrode 12' under a capacitive coupling action, to determine a touch location based on the induction signal. For a location at which there is no finger touch, the sensing electrode 12' only generates a corresponding electrical signal because of an action of the drive electrode 11'. When a user finger performs touch, an induction signal generated by the sensing electrode 11' at a touch location changes because of an action of the finger. A touch electrode in each of the drive electrode 11' and the sensing electrode 12' needs to extend from one end of the display region to another end. Because of a working principle of the touch electrode, in a touch process, a noise signal may be received at any location on the touch electrode because of a capacitive coupling action of another nearby component. A signal finally transmitted by the touch electrode includes cumulative received noise of the entire electrode. Therefore, for a large-area display touch solution, a touch electrode is relatively long, causing much cumulative received noise of the touch electrode. Even if the touch electrode has a relatively low signal-to-noise ratio (SIGNAL-NOISE RATIO, SNR), a touch function tends to be abnormal. For example, it is determined that a touch operation exists at a location at which no user performs touch, that is, a ghost point phenomenon. In addition, for example, for a flexible mobile phone, in a flat state of the mobile phone, a corresponding display area is relatively large, and a touch area is also relatively large. In a bent state of the mobile phone, one part of a display region is located on the front side for a normal display and touch operation. The other part of the display region is bent to the back side of the mobile phone, and no touch operation needs to be performed. However, when holding the mobile phone, a user holds a part that is of a display panel and that is bent to the back side of the mobile phone. Because a touch electrode extends from the front side of the display region to the back side, when the user holds the back side, a signal on the touch electrode is adversely affected by contact of a finger or a palm with the back side. Therefore, cumulative noise on the touch electrode is further increased, in other words, it is easier to cause an accidental touch phenomenon.

The following describes embodiments of this application with reference to accompanying drawings.

Figure 2:
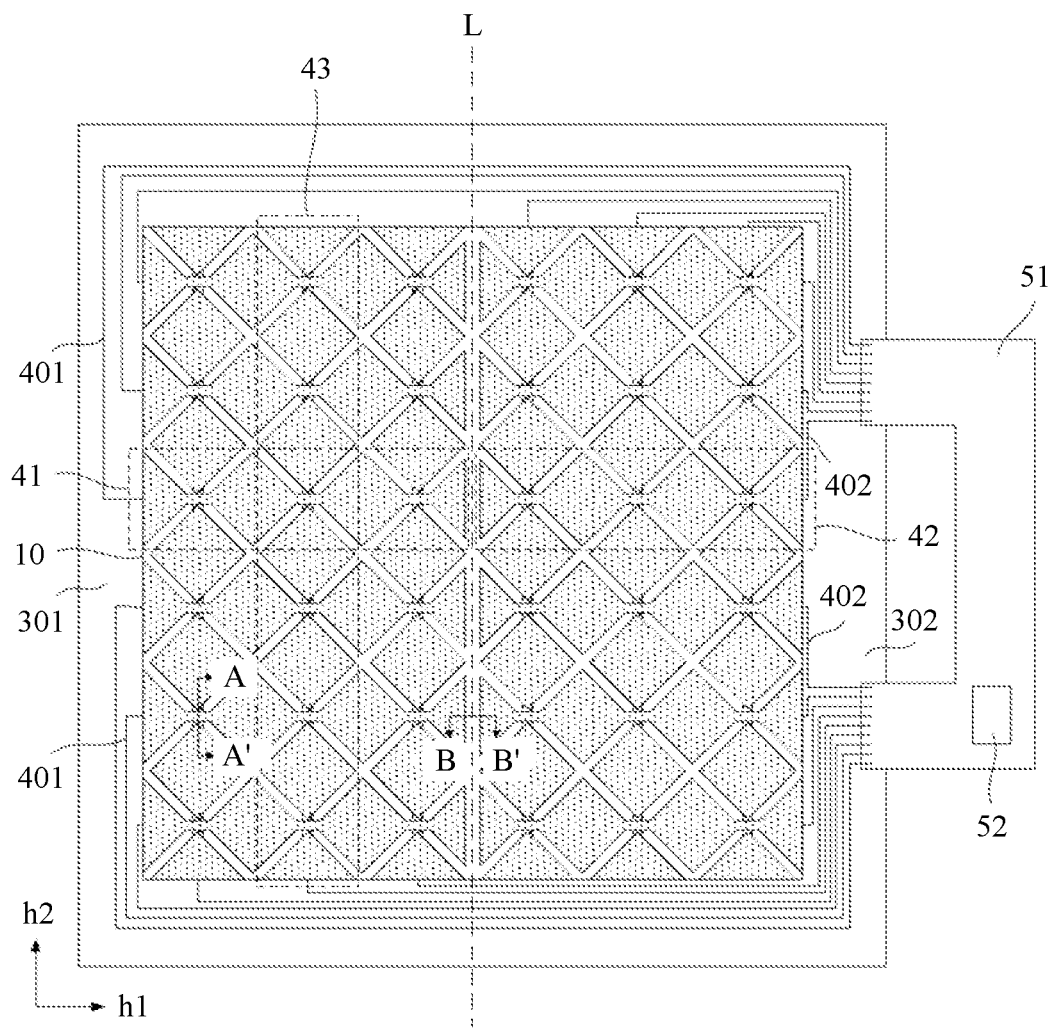
FIG. 2 is a schematic diagram of a structure of a display panel according to an embodiment of this application.
Figure 3:
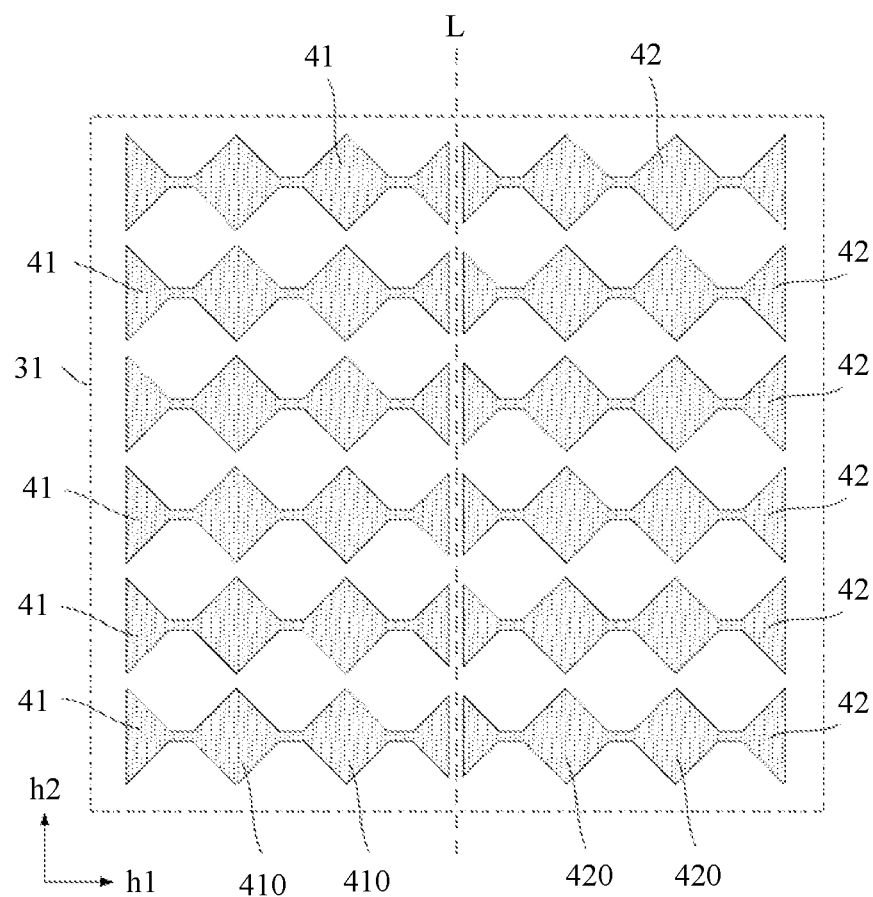
FIG. 3 is a schematic diagram of a structure of a first touch electrode unit in FIG. 2.
Figure 4:
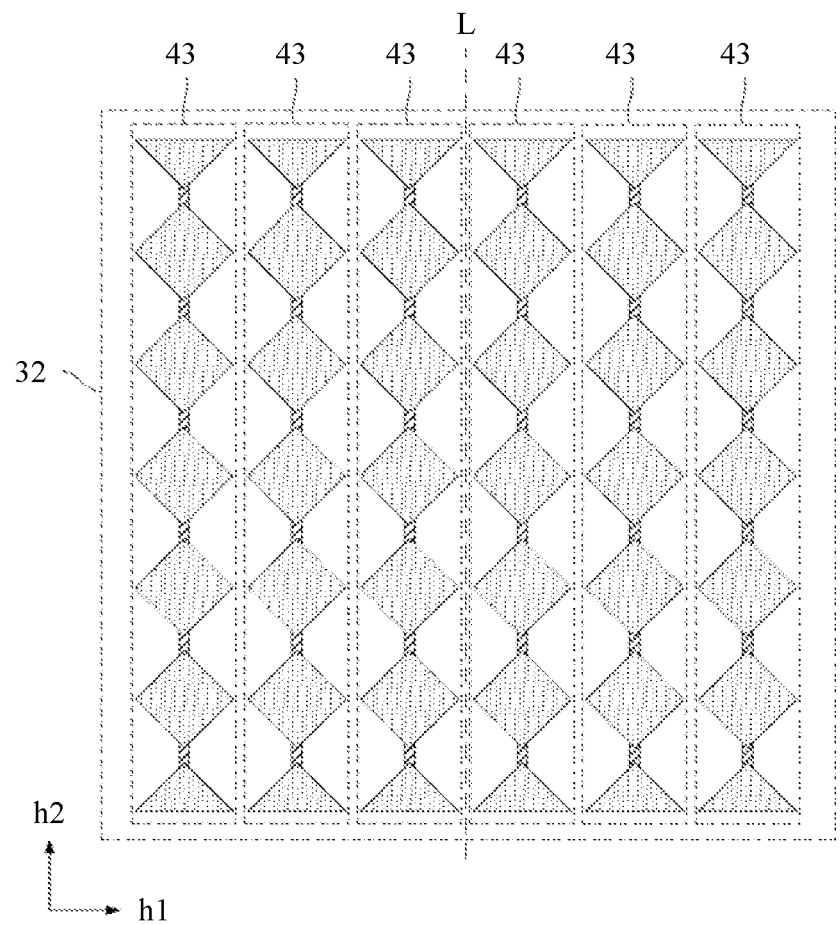
FIG. 4 is a schematic diagram of a structure of a second touch electrode unit in FIG. 2.
Figure 5:
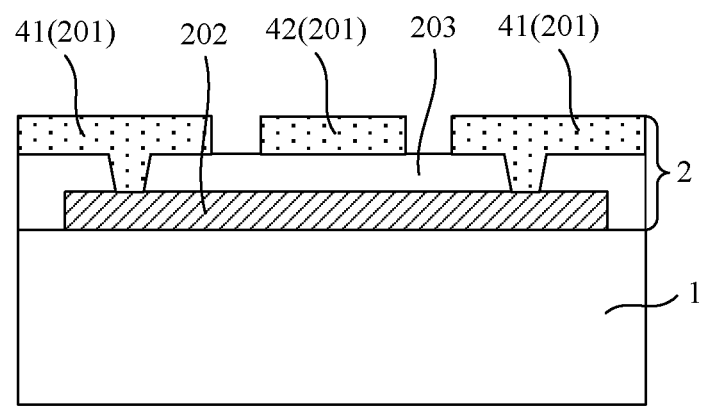
FIG. 5 is a schematic diagram of a cross-sectional structure in a direction AA' in FIG. 2.
Figure 6:
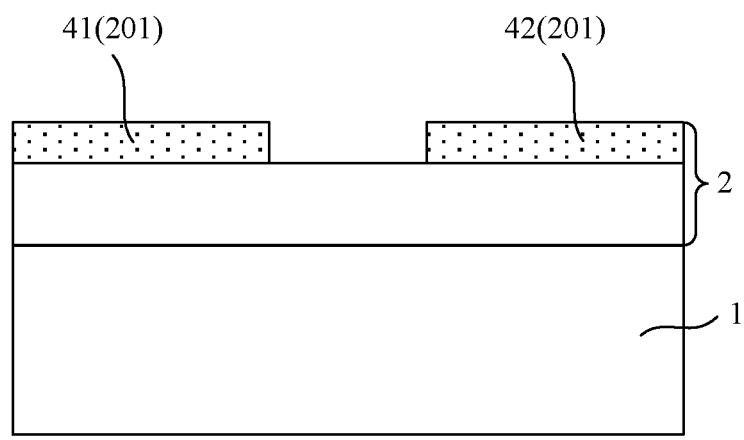
FIG. 6 is a schematic diagram of a cross-sectional structure in a direction BB' in FIG. 2.

Refer to FIG. 2 to FIG. 6. FIG. 2 is a schematic diagram of a structure of a display panel according to an embodiment of this application. FIG. 3 is a schematic diagram of a structure of a first touch electrode unit in FIG. 2. FIG. 4 is a schematic diagram of a structure of a second touch electrode unit in FIG. 2. FIG. 5 is a schematic diagram of a cross-sectional structure in a direction AA' in FIG. 2. FIG. 6 is a schematic diagram of a cross-sectional structure in a direction BB' in FIG. 2. An embodiment of this application provides a display panel, including a display film layer 1 and a mutual-capacitance touch film layer 2 that are stacked. The mutual-capacitance touch film layer 2 includes a drive electrode unit and a sensing electrode unit. One of the drive electrode unit and the sensing electrode unit is a first touch electrode unit 31, and the other one of the drive electrode unit and the sensing electrode unit is a second touch electrode unit 32. The first touch electrode unit 31 includes a plurality of first touch electrodes 41 that extend in a first direction h1 and that are arranged in a second direction h2 and a plurality of second touch electrodes 42 that extend in the first direction h1 and that are arranged in the second direction h2. The plurality of first touch electrodes 41 and the plurality of second touch electrodes 42 are in a one-to-one correspondence, an extension direction of a first touch electrode 41 and an extension direction of a corresponding second touch electrode 42 are located in a same straight line, and the first touch electrode 41 and the corresponding second touch electrode 42 are spaced apart.

Specifically, the touch electrode is a strip electrode, and therefore each touch electrode has an extension direction of the touch electrode, namely, a length direction of the strip electrode. For example, in the structure shown in FIG. 3, the plurality of first touch electrodes 41 are arranged in a plurality of rows in the second direction h2, and each first touch electrode 41 extends in the first direction h1 to form a strip electrode. Similarly, the plurality of second touch electrodes 42 are arranged in a plurality of rows in the second direction h2, and each second touch electrode 42 extends in the first direction h1 to form a strip electrode. An extension direction of a first touch electrode 41 in the first row and an extension direction of a second touch electrode 42 in the first row are located in a same straight line, and the first touch electrode 41 in the first row and the second touch electrode 42 in the first row are spaced apart; an extension direction of a first touch electrode 41 in the second row and an extension direction of a second touch electrode 42 in the second row are located in a same straight line, and the first touch electrode 41 in the second row and the second touch electrode 42 in the second row are spaced apart; and the like. For the second touch electrode unit 32, for example, in the structures shown in FIG. 2 to FIG. 6, the second touch electrode unit 32 includes a plurality of third touch electrodes 43 that are arranged in the first direction h1 and that extend in the second direction h2. Three third touch electrodes 43 on the left and each first touch electrode 41 are insulated and crossed in a left display region, and a touch function of the left display region may be implemented under a mutual capacitance action between the first touch electrode 41 and the third touch electrode 43. Three third touch electrodes 43 on the right and each second touch electrode 42 are insulated and crossed in a right display region, and a touch function of the right display region may be implemented under a mutual capacitance action between the second touch electrode 42 and the third touch electrode 43. Each third touch electrode 43 may include a plurality of electrode blocks arranged in the second direction h2. Each electrode block includes an electrode film layer 201 in the mutual-capacitance touch film layer 2. The mutual-capacitance touch film layer 2 further includes a bridge metal layer 202 and a touch insulation layer 203 located between the electrode film layer 201 and the bridge metal layer 202. In each third touch electrode 43, any two adjacent electrode blocks are electrically connected by using a metal bridge formed by the bridge metal layer 202. One electrode block is electrically connected to the metal bridge by using a via hole on the touch insulation layer 203, and the other electrode block is electrically connected to the same metal bridge by using another via hole on the touch insulation layer 203. In the electrode film layer 201, an interval location between the two electrode blocks is used to implement an electrical connection of the first touch electrode 41 or the second touch electrode 42 in the second direction h2. The first touch electrode 41 and the second touch electrode 42 each include an electrode film layer 201. Therefore, to implement insulation and crossing of different electrodes in different directions, an electrical connection of one type of electrode may be implemented by using a bridge. Each first touch electrode 41, each second touch electrode 42, and each third touch electrode 43 are electrically connected to a flexible circuit board 51 by using touch signal cables, and are further electrically connected to a drive chip 52 by using the flexible circuit board 51. In another feasible implementation, alternatively, each touch electrode may be directly electrically connected to the drive chip by using a touch signal cable. The drive chip 52 is configured to drive each touch electrode and receive a signal on the touch electrode, to implement a touch function.

It should be noted that the foregoing specific structure of the second touch electrode unit is merely an example. A specific structure of the second touch electrode unit is not limited in this embodiment of this application, provided that the second touch electrode and the first touch electrode can implement a touch function through mutual capacitance.

In a touch display process, the second touch electrode unit 32 is configured to determine a touch coordinate location in the first direction h1, and the first touch electrode unit 31 is configured to determine a touch coordinate location in the second direction h2. For example, the first touch electrode 41 in the first row is configured to determine whether there is touch on coordinates corresponding to the first row in the left display region, and the second touch electrode 42 in the first row is configured to determine whether there is touch on coordinates corresponding to the first row in the right display region. The following uses an example in which the first touch electrode unit 31 is the sensing electrode unit and the second touch electrode unit 32 is the drive electrode unit to describe a touch driving method. There may be the following two specific touch driving methods. In the first driving method, all third touch electrodes 43 in an entire touch region sequentially output pulse signals, and all first touch electrodes 41 and second touch electrodes 42 receive induction signals. For a touch location, because an induction signal is changed under a coupling action of a user finger, after the first touch electrode unit 31 receives a touch induction signal, it may be determined, based on time at which the touch induction signal is received, a third touch electrode 43 that generates a pulse to obtain the touch induction signal, in other words, a touch coordinate location in the first direction h1 may be determined. A touch coordinate location in the second direction h2 may be determined based on a location of a first touch electrode 41 or a second touch electrode 42 that receives the touch induction signal. The touch location may be determined based on the two coordinate locations, to implement a touch function. In the second driving method, an entire touch region is divided into a left touch region and a right touch region. The left touch region is a region corresponding to all first touch electrodes 41, and also includes the three third touch electrodes 43 on the left. The right touch region is a region corresponding to all second touch electrodes 42, and also includes the three third touch electrodes 43 on the right. The two touch regions are simultaneously driven. To be specific, three third touch electrodes 43 in each touch region sequentially output pulse signals, and all the first touch electrodes 41 and second touch electrodes 42 receive induction signals. A region to which a touch location belongs may be determined based on the first touch electrode 41 and the second touch electrode 42. A touch coordinate location in the first direction h1 may be determined based on time at which a touch induction signal is received. A touch coordinate location in the second direction h2 may be determined based on a location of a first touch electrode 41 or a second touch electrode 42 that receives the touch induction signal. The touch location may be determined based on the two coordinate locations and the region to which the touch location belongs, to implement a touch function.

In the display panel in this embodiment of this application, one of the drive electrode unit and the sensing electrode unit includes first touch electrodes and second touch electrodes. An extension direction of a first touch electrode and an extension direction of a corresponding second touch electrode are located in a same straight line, and the first touch electrode and the corresponding second touch electrode are spaced apart. Because it is determined that a first touch electrode and a second touch electrode on coordinates in a same second direction are independent of each other, noise received by one of the first touch electrode and the second touch electrode is not added to the other one of the first touch electrode and the second touch electrode, so that a signal-to-noise ratio of the touch electrode is improved, accuracy of touch recognition is improved, and a probability of occurrence of an accidental touch phenomenon is reduced.

Figure 7:
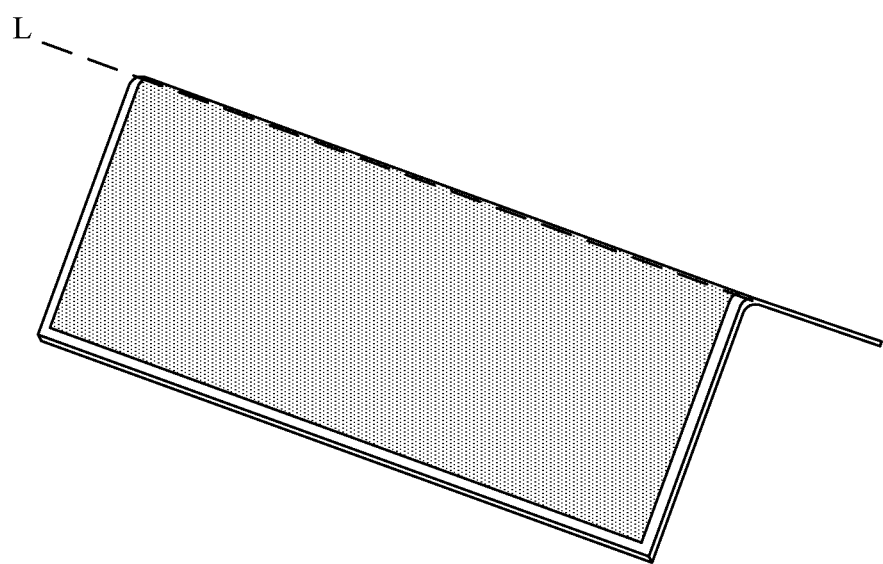
FIG. 7 is a schematic diagram of a three-dimensional structure of the display panel in FIG. 2 in a bent state.

Optionally, refer to FIG. 2 to FIG. 7. FIG. 7 is a schematic diagram of a three-dimensional structure of the display panel in FIG. 2 in a bent state. The display panel is a flexible display panel, the display panel has a bending axis L extending in the second direction h2, and the bending axis L is a maximum stress line of the display panel in the bent state. An interval location between each first touch electrode 41 and a corresponding second touch electrode 42 is located on the bending axis L. In other words, the first touch electrode 41 and the second touch electrode 42 are separated by the bending axis L.

Specifically, for a flexible display panel, when the display panel is in a flat state, a touch display region is relatively large. When the display panel is in a bent state, a touch display region is divided into two parts by a bending axis L: a front touch display region and a back touch display region. All first touch electrodes 41 are located in the front touch display region, and all second touch electrodes 42 are located in the back touch display region. The front touch display region faces a user, and is used to implement a touch display function. The back touch display region is deviated from the user, and does not need to implement the touch function. The user may hold the back touch display region. In this case, because the first touch electrode 41 and the second touch electrode 42 are independent of each other, the first touch electrode 41 is not adversely affected when the user holds the back touch display region, so that touch noise generated when the user holds the bent back side of the display panel is reduced, and a probability of occurrence of an accidental touch phenomenon is reduced.

It should be noted that in another feasible implementation, for a flexible display panel, an interval location between each first touch electrode 41 and a corresponding second touch electrode 42 may be alternatively located on a non-bending axis. Specifically, the interval location between the first touch electrode 41 and the corresponding second touch electrode 42 may be determined as actually required. This is not limited in this embodiment of this application.

Optionally, as shown in FIG. 2 to FIG. 6, the second touch electrode unit 32 includes a plurality of third touch electrodes 43 that extend in the second direction h2 and that are arranged in the first direction h1. One part of the plurality of third touch electrodes 43 and each first touch electrode 41 are insulated and crossed, and the other part of the plurality of third touch electrodes 43 and each second touch electrode 42 are insulated and crossed. A specific working principle and process of the structure are the same as those in the foregoing embodiment, and details are not described herein again.

Optionally, as shown in FIG. 2 to FIG. 6, the first touch electrode unit 31 is the sensing electrode unit, and the second touch electrode unit 32 is the drive electrode unit. Compared with a drive electrode, a sensing electrode is more prone to noise interference. Therefore, a plurality of electrodes that are spaced apart and whose extension directions are located in a same straight line are provided on the sensing electrode unit, so that touch noise can be better reduced. In another feasible implementation, the first touch electrode unit 31 may be the drive electrode unit, and the second touch electrode unit 32 may be the sensing electrode unit.

Figure 8:
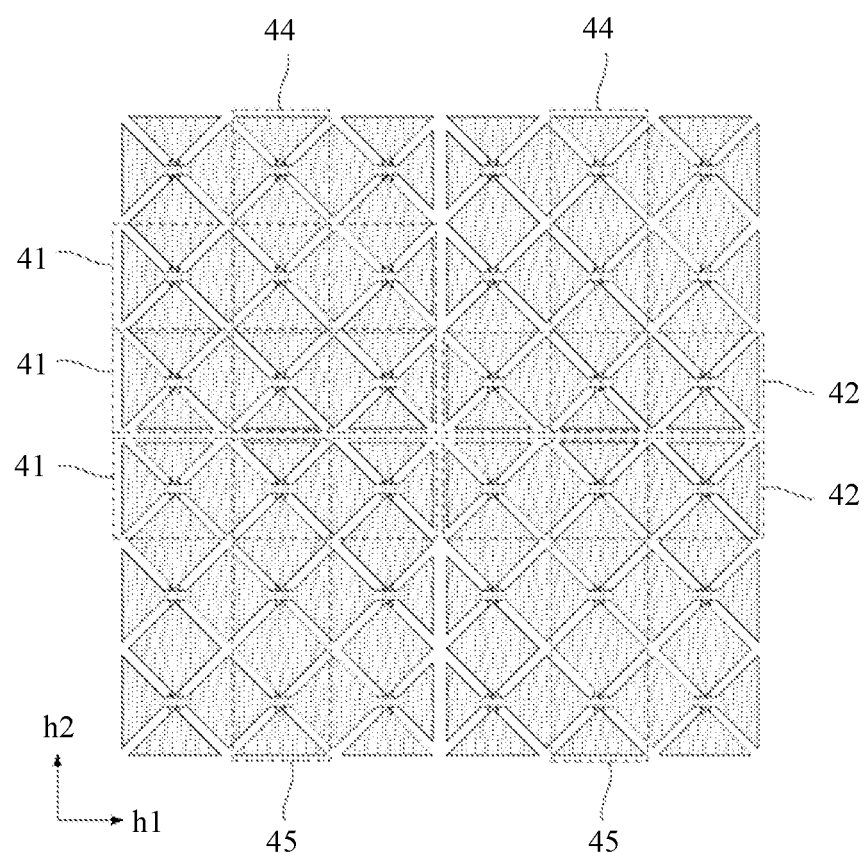
FIG. 8 is a schematic diagram of a structure of another display panel according to an embodiment of this application.
Figure 9:
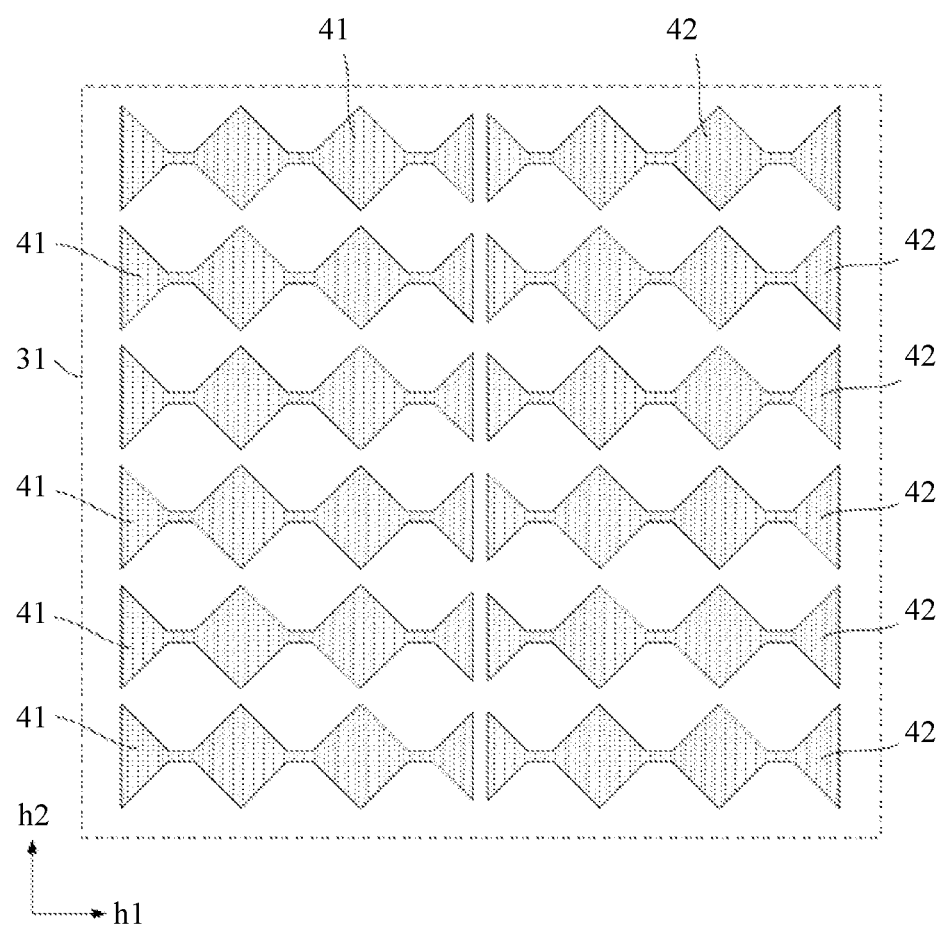
FIG. 9 is a schematic diagram of a structure of a first touch electrode unit in FIG. 8.
Figure 10:
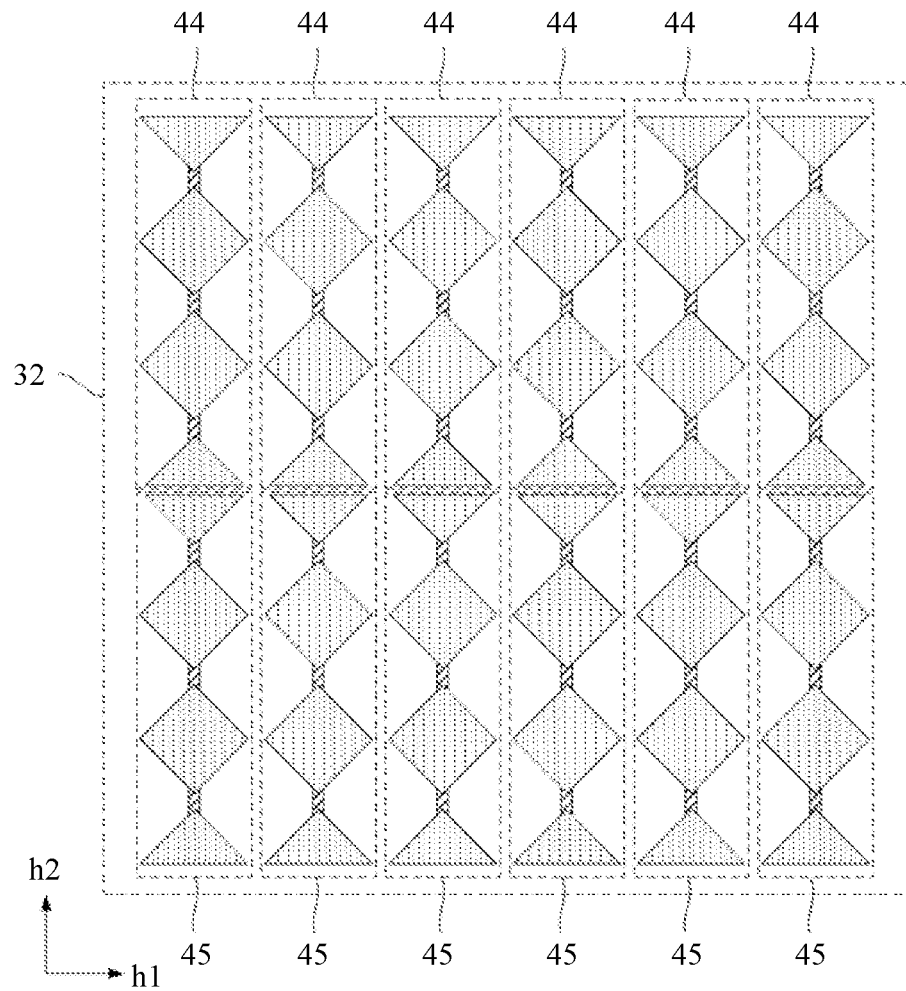
FIG. 10 is a schematic diagram of a structure of a second touch electrode unit in FIG. 8.

Optionally, refer to FIG. 8, FIG. 9, and FIG. 10. FIG. 8 is a schematic diagram of a structure of another display panel according to an embodiment of this application. FIG. 9 is a schematic diagram of a structure of a first touch electrode unit in FIG. 8. FIG. 10 is a schematic diagram of a structure of a second touch electrode unit in FIG. 8. The second touch electrode unit 32 includes a plurality of fourth touch electrodes 44 that extend in a second direction h2 and that are arranged in a first direction h1 and a plurality of fifth touch electrodes 45 that extend in the second direction h2 and that are arranged in the first direction h1. The plurality of fourth touch electrodes 44 and the plurality of fifth touch electrodes 45 are in a one-to-one correspondence, an extension direction of a fourth touch electrode 44 and an extension direction of a corresponding fifth touch electrode 45 are located in a same straight line, and the fourth touch electrode 44 and the corresponding fifth touch electrode 45 are spaced apart. One part of the plurality of fourth touch electrodes 44 and one part of a plurality of first touch electrodes 41 are insulated and crossed, the other part of the plurality of fourth touch electrodes 44 and one part of a plurality of second touch electrodes 42 are insulated and crossed, one part of the plurality of fifth touch electrodes 45 and the other part of the plurality of first touch electrodes 41 are insulated and crossed, and the other part of the plurality of fifth touch electrodes 45 and the other part of the plurality of second touch electrodes 42 are insulated and crossed.

Specifically, a structure other than the first touch electrode unit and the second touch electrode unit is omitted in the display panel in FIG. 8. In the structure shown in FIG. 8, the first touch electrode 41 and the fourth touch electrode 44 are insulated and crossed in an upper left region, to implement a touch function of the region. The second touch electrode 42 and the fourth touch electrode 44 are insulated and crossed in an upper right region, to implement a touch function of the region. The first touch electrode 41 and the fifth touch electrode 45 are insulated and crossed in a lower left region, to implement a touch function of the region. The second touch electrode 42 and the fifth touch electrode 45 are insulated and crossed in a lower right region, to implement a touch function of the region. Compared with the structure shown in FIG. 4, the structure shown in FIG. 8 differs in a structure of the second touch electrode unit 32. In the structure shown in FIG. 8, a touch electrode pair including a fourth touch electrode 44 and a corresponding fifth touch electrode 45 is configured to determine touch coordinates in the first direction h1. Because the fourth touch electrode 44 and the corresponding fifth touch electrode 45 are independent of each other, noise received by one of the fourth touch electrode 44 and the corresponding fifth touch electrode 45 is not added to the other one of the fourth touch electrode 44 and the corresponding fifth touch electrode 45, so that adverse impact on a touch function that is caused by noise is further reduced.

Figure 11:
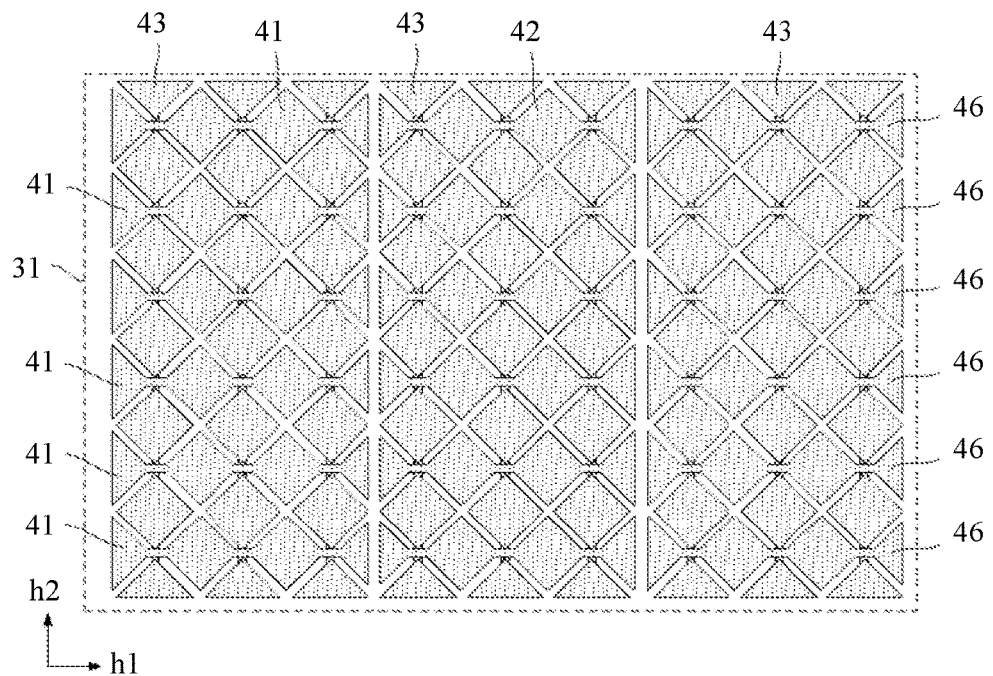
FIG. 11 is a schematic diagram of a structure of another display panel according to an embodiment of this application.
Figure 12:
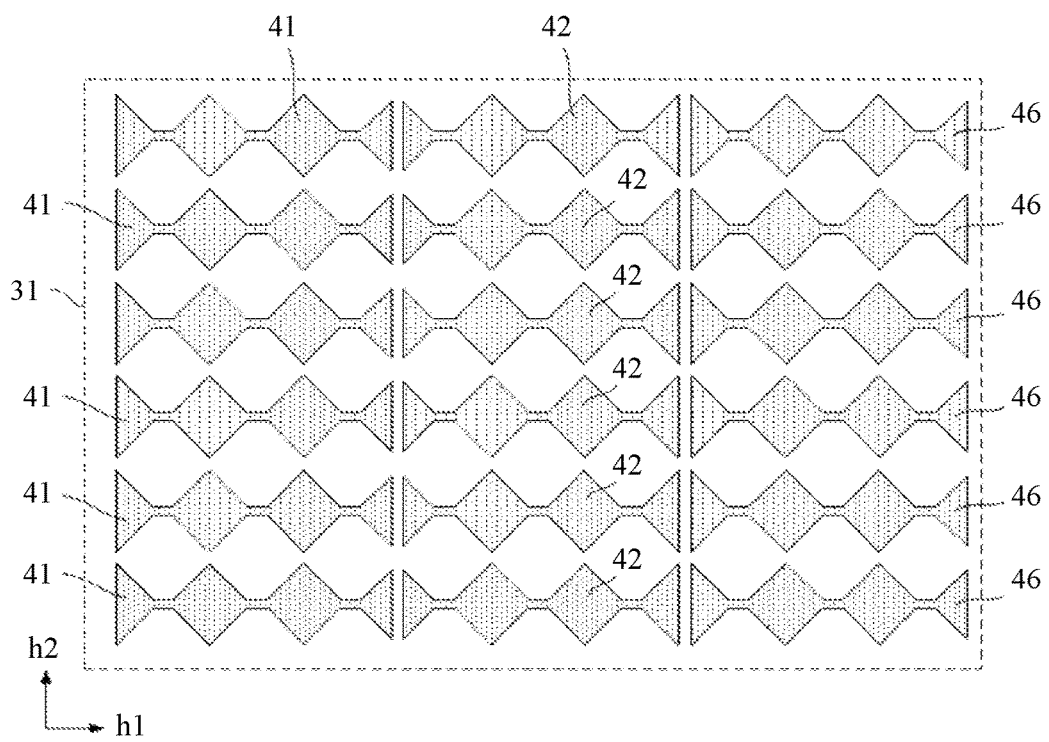
FIG. 12 is a schematic diagram of a structure of a first touch electrode unit in FIG. 11.

Optionally, refer to FIG. 11 and FIG. 12. FIG. 11 is a schematic diagram of a structure of another display panel according to an embodiment of this application. FIG. 12 is a schematic diagram of a structure of a first touch electrode unit in FIG. 11. The first touch electrode unit 31 further includes a plurality of sixth touch electrodes 46 that extend in a first direction h1 and that are arranged in a second direction h2. The plurality of sixth touch electrodes 46 and a plurality of second touch electrodes 42 are in a one-to-one correspondence, an extension direction of a second touch electrode 42 and an extension direction of a corresponding sixth touch electrode 46 are located in a same straight line, the second touch electrode 42 is located between a corresponding first touch electrode 41 and the corresponding sixth touch electrode 46, and the second touch electrode 42 and the corresponding sixth touch electrode 46 are spaced apart.

Specifically, a structure other than the first touch electrode unit and a second touch electrode unit is omitted in the display panel in FIG. 11. A structure of the second touch electrode unit 32 may be the same as the structure shown in FIG. 4. To be specific, the second touch electrode unit includes a plurality of third touch electrodes 43 that are arranged in the first direction h1 and that extend in the second direction h2, three third touch electrodes 43 on the left and the first touch electrode 41 are insulated and crossed, three third touch electrodes 43 in the middle and the second touch electrode 42 are insulated and crossed, and three third touch electrodes 43 on the right and the sixth touch electrode 46 are insulated and crossed. FIG. 11 differs from FIG. 2 in that the sixth touch electrode 46 is added to the first touch electrode unit 31. A corresponding first touch electrode 41, second touch electrode 42, and sixth touch electrode 46 are configured to determine a same touch coordinate location in the second direction h2. In another feasible implementation, four or more touch electrodes whose extension directions are located in a same straight line may be further disposed in the first touch electrode unit, to determine a same touch coordinate location in the second direction.

Optionally, as shown in FIG. 2 to FIG. 6, the display panel includes a display region 10, and an interval location between a first touch electrode 41 and a corresponding second touch electrode 42 is located in the display region 10. In other words, the first touch electrode unit 31 and the second touch electrode unit 32 are located in the same complete display region 10. The complete display region 10 is divided into two touch regions based on locations of the first touch electrode 41 and the second touch electrode 42. One touch region implements a touch function by using the first touch electrode 41, and the other touch region implements a touch function by using the second touch electrode 42. The display film layer 1 in the display region 10 is configured to implement a complete display image. In addition, a touch function in the complete display image may be implemented by using the first touch electrode 41 and the second touch electrode 42. In addition, it should be noted that a specific structure of the display film layer 1 is not limited in this embodiment of this application. For example, the display film layer 1 may be specifically configured to form a liquid crystal display (Liquid Crystal Display, LCD) panel or an organic light-emitting diode (Organic Light-Emitting Diode, OLED) panel.

Optionally, as shown in FIG. 2 to FIG. 6, the display panel further includes a first frame region 301 and a second frame region 302 that are located on two opposite sides of the display region 10. Each first touch electrode 41 extends from the display region 10 to the first frame region 301, and each first touch electrode 41 is electrically connected to a corresponding first touch signal cable 401 in the first frame region 301. Each second touch electrode 42 extends from the display region 10 to the second frame region 302, and each second touch electrode 42 is electrically connected to a corresponding second touch signal cable 402 in the second frame region 302.

Specifically, in the structures shown in FIG. 2 to FIG. 6, because the first touch electrode 41 and the second touch electrode 42 need to be separately electrically connected to the drive chip 52, the first touch electrode 41 on the left is enabled to connect to the first touch signal cable 401 in the first frame region 301, and the second touch electrode 42 on the right is enabled to connect to the second touch signal cable 402 in the second frame region 302. The touch signal cable is usually made of an opaque material such as metal. Therefore, the touch signal cable is enabled to connect to the touch electrode and traced in the frame region instead of being enabled to connect to the touch electrode and traced in the display region, so that adverse impact on display that is caused by the touch signal cable is reduced.

Figure 13:
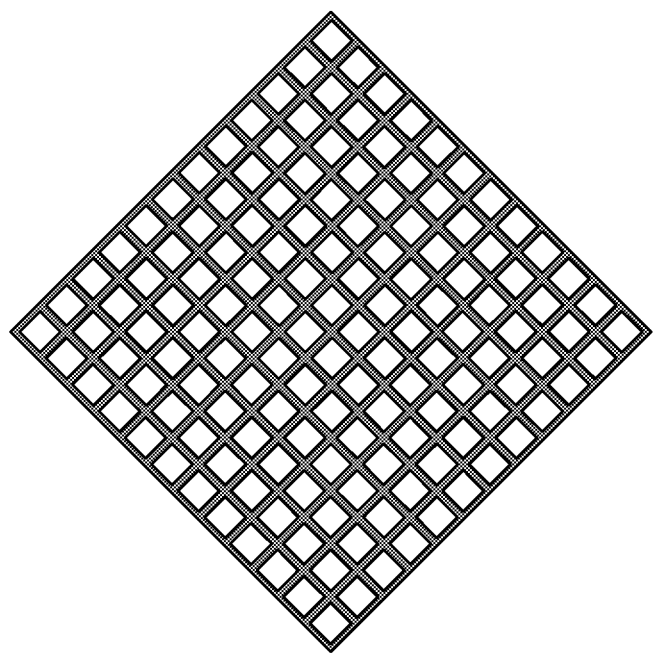
FIG. 13 is a schematic diagram of a structure of a first electrode block or a second electrode block in FIG. 3.

Optionally, refer to FIG. 3 and FIG. 13. FIG. 13 is a schematic diagram of a structure of a first electrode block or a second electrode block in FIG. 3. Each first touch electrode 41 includes a plurality of electrically connected first electrode blocks 410, each first electrode block 410 includes grid metal wires, each second touch electrode 42 includes a plurality of electrically connected second electrode blocks 420, and each second electrode block 420 includes grid metal wires.

In another feasible implementation, alternatively, the first electrode block and the second electrode block may be made of a complete transparent material such as an indium tin oxide material.

According to another aspect, an embodiment of this application further provides a display apparatus, including the display panel in the foregoing embodiments.

A specific structure and principle of the display panel are the same as those in the foregoing embodiments, and details are not described herein again. The display apparatus may be specifically any apparatus, for example, a mobile phone or a tablet computer, that can implement a display function.

In the display apparatus in this embodiment of this application, one of a drive electrode unit and a sensing electrode unit in the display panel includes first touch electrodes and second touch electrodes. An extension direction of a first touch electrode and an extension direction of a corresponding second touch electrode are located in a same straight line, and the first touch electrode and the corresponding second touch electrode are spaced apart. Because it is determined that a first touch electrode and a second touch electrode on coordinates in a same second direction are independent of each other, noise received by one of the first touch electrode and the second touch electrode is not added to the other one of the first touch electrode and the second touch electrode, so that a signal-to-noise ratio of the touch electrode is improved, accuracy of touch recognition is improved, and a probability of occurrence of an accidental touch phenomenon is reduced.

In embodiments of this application, "at least one" means one or more, and "a plurality of" means two or more. The term "and/or" describes an association relationship for describing associated objects and indicates that three relationships may exist. For example, A and/or B may indicate the following three cases: Only A exists, both A and B exist, and only B exists. A and B may be in a singular form or a plural form. The character "/" generally indicates an "or" relationship between the associated objects. At least one of the following items and similar expressions refer to any combination of the items, including a single item or any combination of plural items. For example, at least one of a, b, and c may indicate a, b, c, a and b, a and c, b and c, or a, b, and c, where a, b, and c may be singular or plural.

The foregoing descriptions are merely preferred embodiments of this application, but are not intended to limit this application. For a person skilled in the art, various modifications and variations may be made in this application. Any modification, equivalent replacement, or improvement made without departing from the spirit and principle of this application shall fall within the protection scope of this application.

What is claimed is:

1. A flexible display panel, comprising:
a first frame region comprising an upper left region and a lower left region, wherein the upper left region is independent from the lower left region;
a second frame region comprising an upper right region and a lower right region, wherein the upper right region is independent from the lower right region;
a bending axis located between the first frame region and the second frame region;
a display film layer; and
a mutual-capacitance touch film layer stacked on the display film layer, wherein the mutual-capacitance touch film layer comprises:
a sensing electrode system, comprising:
a plurality of first touch electrodes that extend in a first direction and that are arranged in a second direction extending along the bending axis; and
a plurality of second touch electrodes that extend in the first direction and that are arranged in the second direction, wherein the first touch electrodes and the second touch electrodes are in a one-to-one correspondence, wherein an extension direction of a first touch electrode and an extension direction of a corresponding second touch electrode are arranged in a straight line, and wherein the first touch electrode and the corresponding second touch electrode are spaced apart; and
an interval location between each first touch electrode and a corresponding second touch electrode located on the bending axis; and
a drive electrode system, comprising:
a plurality of fourth touch electrodes that extend in the second direction and that are arranged in the first direction, wherein one or more of the fourth third touch electrodes and each first touch electrode in the upper left region and the upper right region are insulated and crossed, and wherein one or more of the fourth third touch electrodes and each second touch electrode are in the upper left region and the upper right region insulated and crossed; and
a plurality of fifth touch electrodes that extend in the second direction and that are arranged in the first direction, wherein one or more of the fifth touch electrodes and each first touch electrode in the lower left region and the lower right region are insulated and crossed, and wherein one or more of the fifth touch electrodes and each second touch electrode in the lower left region and the lower right region are insulated and crossed.

2. The flexible display panel of claim 1, wherein the sensing electrode system further comprises a plurality of sixth touch electrodes that extend in the first direction and that are arranged in the second direction, wherein the sixth touch electrodes and the second touch electrodes are in a one-to-one correspondence, wherein an extension direction of a second touch electrode and an extension direction of a corresponding sixth touch electrode are located in a same straight line, wherein the second touch electrode is located between a corresponding first touch electrode and the corresponding sixth touch electrode, and wherein the second touch electrode and the corresponding sixth touch electrode are spaced apart.

3. The flexible display panel of claim 1, wherein the display panel further comprises a display region, and wherein an interval location between a first touch electrode and a corresponding second touch electrode is located in the display region.

4. The flexible display panel of claim 3, wherein the display panel further comprises a first frame region and a second frame region that are located on two opposite sides of the display region, wherein each first touch electrode extends from the display region to the first frame region, wherein each first touch electrode is electrically connected to a corresponding first touch signal cable in the first frame region, wherein each second touch electrode extends from the display region to the second frame region, and wherein each second touch electrode is electrically connected to a corresponding second touch signal cable in the second frame region.

5. The flexible display panel of claim 1, wherein each first touch electrode comprises a plurality of electrically connected first electrode blocks, wherein each first electrode block comprises grid metal wires, wherein each second touch electrode comprises a plurality of electrically connected second electrode blocks, and wherein each second electrode block comprises grid metal wires.

6. A display apparatus, comprising:
a flexible display panel, comprising:
a first frame region comprising an upper left region and a lower left region, wherein the upper left region is independent from the lower left region;
a second frame region comprising an upper right region and a lower right region, wherein the upper right region is independent from the lower right region;
a bending axis located between the first frame region and the second frame region;
a display film layer; and
a mutual-capacitance touch film layer stacked on the display film layer, wherein the mutual-capacitance touch film layer comprises:
a sensing electrode system, comprising:
a plurality of first touch electrodes that extend in a first direction and that are arranged in a second direction along the bending axis;

a plurality of second touch electrodes that extend in the first direction and that are arranged in the second direction, wherein the first touch electrodes and the second touch electrodes are in a one-to-one correspondence, wherein an extension direction of a first touch electrode and an extension direction of a corresponding second touch electrode are located in a same straight line, and wherein the first touch electrode and the corresponding second touch electrode are spaced apart; and an interval location between each first touch electrode and a corresponding second touch electrode located on the bending axis; and a drive electrode system, comprising:

a plurality of fourth touch electrodes that extend in the second direction and that are arranged in the first direction, wherein one or more of the fourth touch electrodes and each first touch electrode in the upper left region and the upper right region are insulated and crossed, and wherein one or more of the fourth touch electrodes and each second touch electrode in the upper left region and the upper right region are insulated and crossed; and a plurality of fifth touch electrodes that extend in the second direction and that are arranged in the first direction, wherein one or more of the fifth touch electrodes and each first touch electrode in the lower left region and the lower right region are insulated and crossed, and wherein one or more of the fifth touch electrodes and each second touch electrode in the lower left region and the lower right region are insulated and crossed.

7. The display apparatus of claim 6, wherein the sensing electrode system further comprises a plurality of sixth touch electrodes that extend in the first direction and that are arranged in the second direction, wherein the sixth touch electrodes and the second touch electrodes are in a one-to-one correspondence, wherein an extension direction of a second touch electrode and an extension direction of a corresponding sixth touch electrode are located in a same straight line, wherein the second touch electrode is located between a corresponding first touch electrode and the corresponding sixth touch electrode, and wherein the second touch electrode and the corresponding sixth touch electrode are spaced apart.

8. The display apparatus of claim 6, wherein the flexible display panel further comprises a display region, and wherein an interval location between a first touch electrode and a corresponding second touch electrode is located in the display region.

9. The display apparatus of claim 8, wherein the flexible display panel further comprises a first frame region and a second frame region that are located on two opposite sides of the display region; wherein each first touch electrode extends from the display region to the first frame region, and each first touch electrode is electrically connected to a corresponding first touch signal cable in the first frame region; and wherein each second touch electrode extends from the display region to the second frame region, and wherein each second touch electrode is electrically connected to a corresponding second touch signal cable in the second frame region.

10. The display apparatus of claim 6, wherein each first touch electrode comprises a plurality of electrically connected first electrode blocks, wherein each first electrode block comprises grid metal wires, wherein each second touch electrode comprises a plurality of electrically connected second electrode blocks, and wherein each second electrode block comprises grid metal wires.

11. The display apparatus of claim 6, wherein each first electrode block and each second electrode block consists of a complete transparent material.

12. The display apparatus of claim 11, wherein each first electrode block and each second electrode block comprises an indium tin oxide material.

13. The flexible display panel of claim 1, wherein each first electrode block and each second electrode block consists of a complete transparent material.

14. The flexible display panel of claim 13, wherein each first electrode block and each second electrode block comprises an indium tin oxide material.

15. A method for assembling a flexible display panel, the method comprising:

providing a first frame region comprising an upper left region and a lower left region, wherein the upper left region is independent from the lower left region;

providing a second frame region comprising an upper right region and a lower right region, wherein the upper right region is independent from the lower right region; and stacking a mutual-capacitance touch film layer on a display film layer, wherein assembling the mutual-capacitance touch film layer comprises:

forming a sensing electrode system, by:

arranging a plurality of first touch electrodes that extend in a first direction in a second direction along a bending axis located between the first frame region and the second frame region;

arranging a plurality of second touch electrodes that extend in the first direction in the second direction, wherein the first touch electrodes and the second touch electrodes are in a one-to-one correspondence, wherein an extension direction of a first touch electrode and an extension direction of a corresponding second touch electrode are positioned in a straight line, and wherein the first touch electrode and the corresponding second touch electrode are spaced apart; and providing an interval location between each first touch electrode and a corresponding second touch electrode located on the bending axis; and forming a drive electrode system by:

arranging a plurality of fourth touch electrodes that extend in the second direction in the first direction, wherein one or more of the fourth touch electrodes and each first touch electrode in the upper left region and the upper right region are insulated and crossed, and wherein one or more of the fourth touch electrodes and each second touch electrode in the upper left region and the upper right region are insulated and crossed; and arranging a plurality of fifth touch electrodes that extend in the second direction and that are arranged in the first direction, wherein one or more of the fifth touch electrodes and each first touch electrode in the lower left region and the lower right region are insulated and crossed, and wherein one or more of the fifth touch electrodes and each second touch electrode in the lower left region and the lower right region are insulated and crossed.

16. The method for assembling the flexible display panel of claim 15, wherein forming the sensing electrode system further comprises providing a plurality of sixth touch electrodes that extend in the first direction and that are arranged in the second direction, wherein the sixth touch electrodes and the second touch electrodes are in a one-to-one correspondence, wherein an extension direction of a second touch electrode and an extension direction of a corresponding sixth touch electrode are located in a same straight line, wherein the second touch electrode is located between a corresponding first touch electrode and the corresponding sixth touch electrode, and wherein the second touch electrode and the corresponding sixth touch electrode are spaced apart.

17. The method for assembling the flexible display panel of claim 15, further comprising forming a display region, and wherein an interval location between a first touch electrode and a corresponding second touch electrode is located in the display region.

18. The method for assembling the flexible display panel of claim 15, further comprising forming a display film layer comprising a Liquid Crystal Display (LCD) panel display region.

19. The method for assembling the flexible display panel of claim 15, further comprising forming a display film layer comprising an Organic Light Emitting Diode (OLED) panel display region.

20. The method for assembling the flexible display panel of claim 15, further comprising forming each first electrode block and each second electrode block from an indium tin oxide material.

* * * * *

UNITED STATES PATENT AND TRADEMARK OFFICE
CERTIFICATE OF CORRECTION

PATENT NO. : 12,333,107 B2
APPLICATION NO. : 18/629163
DATED : June 17, 2025
INVENTOR(S) : Tawei Kuo, Junyong Zhang and Haiming He Page 1 of 1

It is certified that error appears in the above-identified patent and that said Letters Patent is hereby corrected as shown below:

In the Claims

Claim 1, Column 11, Line 67: "fourth third touch" should read "fourth touch"

Signed and Sealed this
Twenty-ninth Day of July, 2025

Coke Morgan Stewart
*Acting Director of the United States Patent and Trademark Office*